Dec. 10, 1963 M. M. OVERMAN 3,113,555
AQUARIUM CONSTRUCTION
Filed Oct. 30, 1961
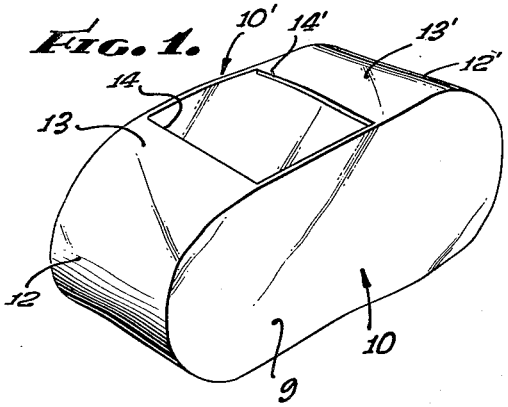
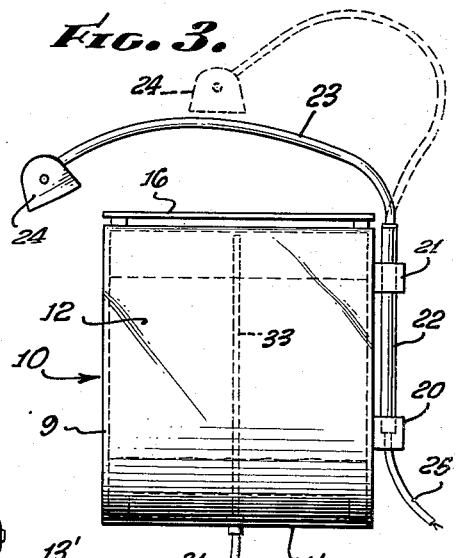
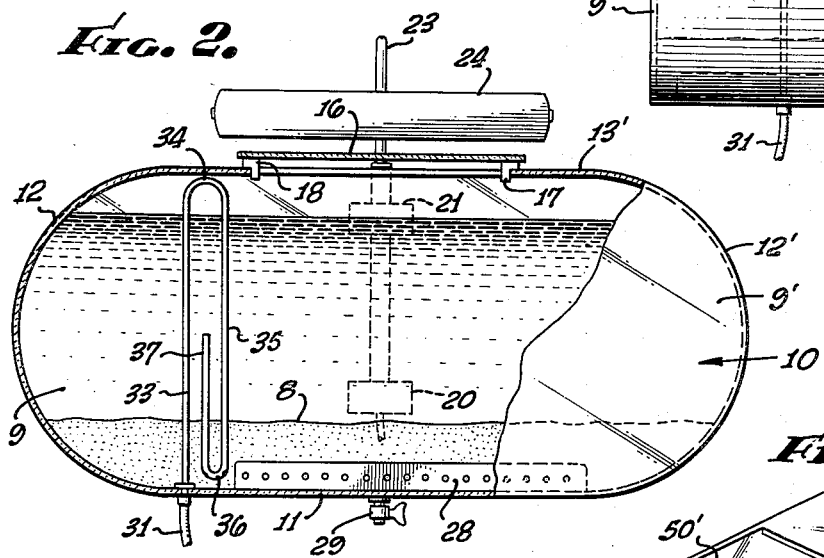
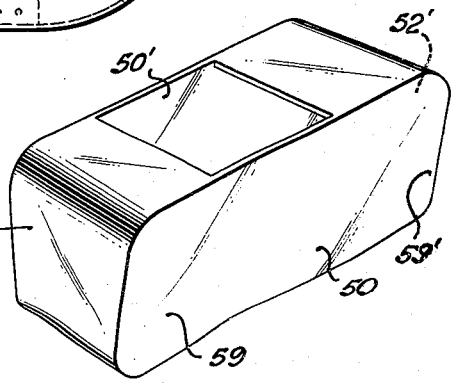
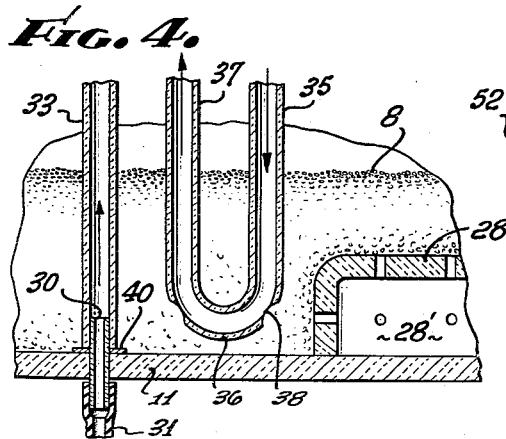
INVENTOR.
MARVYN M. OVERMAN
BY
Miketta and Glenny
ATTORNEYS.

United States Patent Office 3,113,555
Patented Dec. 10, 1963

3,113,555
AQUARIUM CONSTRUCTION
Marvyn Marion Overman, 14,944 Greenleaf St.,
Sherman Oaks, Calif.
Filed Oct. 30, 1961, Ser. No. 148,377
10 Claims. (Cl. 119—5)

The present invention is directed to improvements in the construction of aquariums and is particularly directed to a construction for a lightweight, corrosion resistant, strong aquarium adapted for use with either fresh or salt water, the construction permitting the forces generated by the weight of water carried by the aquarium to be converted into a stress tension of the walls, the construction thereby permitting the use of relatively thin, transparent wall materials and the elimination of the unsightly, vision impairing metal frames which characterize prior aquariums.

The normal, heretofore known type of aquarium was made of an angle iron frame and five pieces of plate glass retained in the frame, such pieces of glass constituting the four walls and the bottom. In some instances the bottom was made of metal. Various plastics and sealants were used between the plates of glass and the metal frame members but even a minor shifting movement or flexure of an aquarium causes the sealant to lose its water sealing properties. The hydrostatic head of the water contained in an aquarium is exerted radially, in a direction normal to the plane of each glass wall and as a result relatively thick pieces of plate glass need be used to prevent bulging of the walls and breakage of the seals. As a result, the average aquarium is a heavy, unsatisfactory object which cannot be shipped economically or with any degree of safety since the frame can become quickly misaligned and the sealing compound rendered completely ineffective. Furthermore, although in recent years great interest has been exhibited in fish that live in salt water, the usual type of aquarium is unsuited for the display of salt water fish. Both fresh and salt water dissolve and impair sealants, but salt water has an excessive leaching action upon the usual mastics, cements and sealants employed and, in addition, exerts an active corrosive effect upon metal. The use of stainless steel or other corrosion resisting metal in the frame of an aquarium increases the cost excessively. For the reasons above enumerated, it has been estimated that 7% to 12% of aquariums exhibit leakage and often cause damage.

An aquarium constructed in accordance with the present invention on the other hand, employs only three pieces of transparent material, results in an aquarium which is decorative, completely transparent, does not employ metal of any sort, exposes the entire contents of the aquarium to unobstructed view, is light in weight and capable of being used with either fresh or salt water. In addition, the present invention contemplates various adjuncts to an aquarium whereby the contents of the aquarium may be illuminated from any desired position, droppings readily disposed of, the aquarium properly aerated, and the fish contained in such aquarium exposed to study and observation in a very effective and attractive manner.

It is an object of the present invention therefore to disclose and provide a novel, stressed-skin construction for a lightweight, corrosion resistant aquarium adapted for use with either fresh or salt water. A further object of the invention is to disclose and provide a construction for aquariums whereby the use of metal and short-lived sealants is eliminated.

A further object of the invention is to disclose and provide means and methods whereby aquariums may be constructed in such manner that the contents are made much more visible than in prior devices.

Again, another object of the invention is to disclose and provide various improvements and adjuncts for use in aquariums whereby the maintenance of an aquarium is rendered more effective and easily accomplished.

These and various other objects and advantages of the present invention will become apparent from the following more detailed description, reference being had to the appended drawings in which:

FIG. 1 is a perspective view of a simplified form of aquarium constructed in accordance with the present invention.

FIG. 2 is an enlarged side elevation of an aquarium of the present invention, a portion of the side wall being broken away.

FIG. 3 is an end view of the aquarium illustrated in FIG. 2.

FIG. 4 is an enlarged view, partly in section, of a portion of the aquarium shown in FIG. 2.

FIG. 5 is a perspective view of a slightly modified form of aquarium contemplated by this invention.

Although aquariums may range in size from a capacity of 5 gallons to as high as 50 gallons (such sizes being used in homes and offices by hobbyists and as decorative or conversation pieces) the present invention is applicable to all sizes of aquariums, including even very large aquariums used in museums of natural history, etc. The materials employed in the construction of aquariums persuant to this invention are cast or preformed, transparent sheet plastics, generally made of acrylic resins such as the polymethyl methacrylates, although other organic resinous materials in sheet form having the desired clarity, strength and stability may also be used. A preferred form of construction, illustrated in the drawings, permits the construction of an aquarium such as is illustrated in FIG. 1, from only three pieces of such sheet material, namely a pair of transparent side members 10 and 10′ and a single sheet of similar transparent material formed and curved to form the bottom 11 as well as the ends 12 and 12′ of the aquarium. The transparent side members 10 and 10′ are preferably in spaced, virtually parallel planes and each member has a bottom edge, a top edge parallel thereto and curved end margins defining virtually semi-circular end portions 9 and 9′ of each such member. The edges of the sheet forming the bottom and ends, are firmly bonded to and made substantially integral with the edge portions of side members 10 and 10′. It is to be noted that the sheet which forms the ends and bottom of the aquarium is shorter than the perimeter of a side member and the end portions 13 and 13′ of such sheet member lie in the plane of the top edges of the sides 10 and 10′ and are spaced from each other so as to provide an access opening defined by the edges 14 and 14′.

The pair of transparent side members 10 and 10′ are intimately bonded to the sheet of resinous material by means of a solvent adhesive which is also transparent and which is compatible with the organic resins which form the side walls. In actual practice an acrylic resin in a suitable solvent is used as such bonding adhesive and it has been found that such adhesives are not only resistant to water and other fluids but have substantially the same strength as the sheet materials which comprise the walls of the aquarium.

As a result, the entire aquarium is unitary, integral and transparent and does not include any opaque metallic elements which may contact the fluid in the aquarium or which would impair visibility of the contents. The aquarium is in effect monolithic and when filled with water (generally to a height indicated by the dash-dot line in FIG. 2) all of the members forming the side walls, end walls and bottom are in tension. By referring to FIG. 2 it will be noted that the end portions 13 and 13′ of the curved sheet extend inwardly of the ends 12 and 12′ of the aquarium thereby substantially enclosing at least those portions of the body of water contained in the end portions of the aquarium. These end portions 13 and 13' bridge and connect sides 10 and 10' in zones removed from the ends of the aquarium by a distance of between 20% and 40% of the total length of the aquarium.

The access opening defined by the marginal edges 14 and 14' and the top edges of the side members 10 and 10' permits ready access to the interior of the aquarium. In actual practice such access opening also provides suitable ventilation. In order to provide ventilation and at the same time prevent dust or foreign matter to fall into the aquarium, a removable cover plate 16 is provided, such plate carrying small positioning lugs 17, 18 and the like which support the cover plate 16 at a suitable height above the access opening and at the same time prevent such cover plate from shifting laterally.

The exterior surface of one of the side members such as for example the side member 10' may be provided with support means for carrying a suitable light standard. Such support means may comprise one or more blocks of transparent material (preferably organic resin) such as are indicated at 20 and 21 securely bonded in vertical alignment to the outer surface of the side member. The upper of these members 21 may be provided with a through bore; the lower support member 20 may be provided with a recess or stepped bore and an axially disposed, lower, smaller diameter bore. A light standard comprising a rigid tube 22 provided with a flexible extension 23 having a suitable hooded light source 24 at its outer end is now inserted through the bore of the upper support 21 and into the recess of the lower support 20. The electrical conductor wire 25 may lead to a suitable source of current through the small diameter port in the base in the bottom of the recess. With such an arrangement, the light source may be moved into any desired position with respect to the top or even the front of the aquarium. Heretofore, light sources customarily employed with aquariums were only able to illuminate the contents from above, but the arrangement herein disclosed permits the light source to be moved so as to illuminate the front of the aquarium thereby permitting the viewer to observe the beauty of the fish in greater detail. The flexibility of the lighting arrangements so provided is exemplified in FIG. 3 by illustrating a second position of the light source 24 in dash lines.

Moreover, it will be noted that since the supports 20 and 21 are transparent and are bonded to the transparent rear side member 10' by means of a suitable solvent or transparent bonding agent or adhesive, only the vertical rigid standard 22 is visible through the aquarium.

In actual practice the bottom of an aquarium is normally covered with a bed of sand, plantings, shells and various other decorative elements. Fish droppings accumulate and an aquarium has to be cleaned periodically. Cleaning of an aquarium is facilitated by the use of the materials and the construction herein disclosed. In order to facilitate cleaning a ported or slotted sump member 28 is placed within the aquarium so as to rest on the bottom thereof, such sump member forming a sump chamber 28' between the bottom of the aquarium and the ported member 28. A discharge port is drilled in the bottom 11 and placed in communication with the sump chamber. The discharge port is provided with a valve such as the one illustrated at 29 (FIG. 2) capable of being attached to a flexible rubber discharge hose. An arrangement such as has been described hereinabove permits the droppings to filter down through a bed of sand (generally indicated at 8 in FIG. 2) and find their way to the sump. Such accumulated heavy sump water can be periodically discharged through the valved outlet 29. The sump chamber preferably covers 40% or more of the bottom of the aquarium but need be only between 0.5 and 1.0 inch high.

It is to be remembered that resinous transparent plastics such as the methacrylates can be readily drilled and sawn or otherwise worked. As a result, it is very easy to affix a preformed polyamid copolymer or other organic plastic valve assembly into a discharge port, bonding of the two elements being readily accomplished by the use of a resinous adhesive or by simply softening the contacting surfaces with a suitable solvent or mixture of solvents such as methylene chloride and diacetone alcohol and pressing them together to form a welded bond.

The workability of the transparent resinous plastics also permits the introduction of aerating air into the aquarium through a bottom inlet port instead of having the usual arrangement of tubing, etc., extending in an unsightly manner over the upper edge of an aquarium. As shown in greater detail in FIG. 4, the bottom 11 of the aquarium may be provided with an air supply port having a short piece of plastic tubing 30 extending therethrough and sealed in said port by means of a transparent adhesive. Air can be supplied through the supply means 30 by means of a flexible hose or tubing 31 connected to a suitable pump. The upper or internal extension of the air supply means may support an aerator assembly. The particular aerator assembly illustrated in the drawings comprises a piece of transparent tubing bent with two reverse bends, so as to form an air inlet end 33, and upper bend 34 extending above the normal water level in the aquarium, a down leg 35, a lower bend 36 and a short upwardly directed discharge leg 37. This assembly may be slipped upon the upstanding air supply means 30 (a suitable washer or cushion 40 being introduced between the bottom of the tube 30 and the bottom 11 of the aquarium). One or more openings or ports 38 are formed in the lower bend 36 of the assembly, such lower bend and liquid inlet ports 38 being preferably located adjacent one end of the ported sump member 28. The arrangement herein described not only easily and effectively supplies air to the aquarium but has a tendency to withdraw gases or malodorous substances which may emanate from the sump chamber 28'.

A substantially monolithic, completely transparent aquarium constructed in the manner herein described is resistant to bacterial or fungus deterioration (which normally attacks mastics and sealants), provides unobstructed view of the contents, weighs only one-half as much as a normal aquarium of the same capacity (unfilled), and is much stronger and rugged. The lack of brittleness, the clarity and low density of the organic, cast plastics is utilized to best advantage and the monolithic construction permits the high tensile strength of these plastics to provide a stressed-skin aquarium without distortion. Whereas, a customary, box-like metal framed glass aquarium of 50 gallon capacity is only adapted to imperfectly display fresh water fish and requires heavy 0.75" thick glass walls, an aquarium of the same capacity made by the use of this invention is adapted for use with either fresh or salt water, employs plastic walls only 0.375" and 0.312" in thickness, eliminates the need for metal framing and permits complete visibility.

It may be noted that the side members 10 and 10' need not be parallel (although a vertically parallel relationship is generally used). Moreover, the curved end portions 9 and 9' of these side members need not be defined by semi-circular margins, but may be elliptical or curved or a combination of curved and rectilinear margins. FIG. 5 exemplifies one of such modified forms and it will be noted that the side members 50 and 50' lie in inclined planes so as to have their upper edges spaced farther apart than the spacing between their lower edges and the curved end portions such as 59 and 59' of side member 50 each include curved upper and lower marginal edges interconnected by a rectilinear edge.

It is to be understood that an aquarium of the type herein disclosed is usually supported upon a suitable stand (or frame supported by a table, shelf or other construction) so that the valves and air inlet means are readily accessible. Such stands and frames have not been shown in the drawings.

All modifications and adaptations of the invention herein disclosed and claimed are embraced thereby.

I claim:

1. A stressed-skin construction for a lightweight corrosion resistant aquarium adapted for use with salt water, comprising:

a pair of transparent side members of thermoplastic organic resin, said members being in spaced, virtually parallel planes, each member having a bottom edge, a top edge parallel thereto, and curved end margins defining virtually semicircular end portions of said members;

and a single sheet of transparent resinous material connecting the bottom edge portions and entire curved end margins of said members, said single sheet being firmly connected to said members by transparent resinous material;

end portions of said sheet lying in the plane of the top edges of said members, and spaced from each other to provide an access opening to said aquarium.

2. An aquarium as stated in claim 1 wherein the exterior surface of one of said side members is provided with a light standard support made of transparent plastic and bonded to said surface with a transparent resin; and a light standard removably and adjustably carried by said support, said light standard including a flexible extension provided with a light source adapted to be selectively positioned above and in front of said aquarium whereby light emanating from the light source is directed through one of the transparent side members to illuminate the interior of the aquarium by rearwardly directed light.

3. An aquarium as stated in claim 1 including an air supply port in the bottom wall of said aquarium and a tubular air supply means extending through and intimately sealed in said port by a transparent resin.

4. An aquarium as stated in claim 1 including an air supply port in the bottom wall of said aquarium and a tubular air supply means extending through and intimately sealed in said port by a transparent resin; and an aerator assembly connected to and positioned by the inner portion of the air supply means within the aquarium, said aerator assembly including a portion extending above level of liquid normally maintained in the aquarium.

5. A substantially transparent, lightweight monolithic aquarium presenting a continuous inner surface resistant to the action of salt water comprising;

a pair of planar transparent side members of organic resin, said members being in spaced, virtually vertical planes, each member having a top edge, a bottom edge parallel thereto, and end margins including curved edge portions confluent with said top and bottom edges;

and a sheet of planar transparent material extending between said side members said sheet being provided with curved portions, longitudinal edges of said sheet being firmly and intimately bonded to the bottom edge portions and end margins of said side members with a transparent resin, end portions of said sheet extending toward each other along the top edges of said side members but terminating in spaced relation to provide an access opening having a length of from about 25% to 60% of the overall length of said aquarium;

said construction effectively converting the hydrostatic head and horizontally directed pressure forces of liquid in such aquarium into a stress tension in the side walls and sheet.

6. An aquarium as stated in claim 5 wherein the exterior surface of one of said side members is provided with a light standard support made of transparent plastic and bonded to said surface with a transparent resin; and a light standard removably and adjustably carried by said support, said light standard including a flexible extension provided with a light source adapted to be selectively positioned above and in front of said aquarium whereby light emanating from the light source is directed through one of the transparent side members to illuminate the interior of the aquarium by rearwardly directed light.

7. An aquarium as stated in claim 5 including: a ported sump member within the aquarium and resting on the bottom thereof and adapted to form a sump chamber above the bottom portion of said sheet, the ports in said sump member being adapted to preclude passage of sand into said chamber; a discharge port in said bottom and in communication with said chamber, and a valve firmly bonded to said port.

8. An aquarium as stated in claim 7 including: an air supply port in the bottom wall of said aquarium and a tubular air supply means extending through and intimately sealed in said port by a transparent resin and having intake openings spaced from said sump chamber.

9. An aquarium as stated in claim 5 including: an air supply port in the bottom wall of said aquarium and a tubular air supply means extending through and intimately sealed in said port by a transparent resin, and an aerator assembly connected to and positioned by the inner portion of the air supply means within the aquarium, said aerator assembly including a portion extending above the level of liquid normally maintained in the aquarium.

10. An aquarium as stated in claim 5 including: a transparent, removable cover plate of larger area than said access opening, said transparent cover plate being provided with stepped lugs adapted to engage end portions of said sheet to position said plate in spaced relation above said access opening and to prevent lateral displacement of such cover plate.

References Cited in the file of this patent

UNITED STATES PATENTS

| | | |
|---|---|---|
| 2,696,800 | Rork | Dec. 14, 1954 |
| 2,871,820 | Hayden | Feb. 3, 1959 |
| 2,879,742 | Morrill | Mar. 31, 1959 |
| 3,018,758 | Arnould | Jan. 30, 1962 |